United States Patent
Alsewailem

(10) Patent No.: US 9,180,618 B2
(45) Date of Patent: Nov. 10, 2015

(54) TWIN SCREW EXTRUDER

(75) Inventor: Fares D. Alsewailem, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 207 days.

(21) Appl. No.: 13/422,607

(22) Filed: Mar. 16, 2012

(65) Prior Publication Data

US 2013/0242689 A1 Sep. 19, 2013

(51) Int. Cl.
| | |
|---|---|
| *B29C 47/80* | (2006.01) |
| *B01F 7/24* | (2006.01) |
| *B29B 7/48* | (2006.01) |
| *B29C 47/36* | (2006.01) |
| *B29C 47/76* | (2006.01) |
| *B29C 47/92* | (2006.01) |
| *B29C 47/60* | (2006.01) |
| *B29B 7/84* | (2006.01) |
| *B29C 47/00* | (2006.01) |

(Continued)

(52) U.S. Cl.
CPC ............ *B29C 47/805* (2013.01); *B01F 7/241* (2013.01); *B29B 7/482* (2013.01); *B29B 7/484* (2013.01); *B29C 47/366* (2013.01); *B29C 47/402* (2013.01); *B29C 47/406* (2013.01); *B29C 47/6056* (2013.01); *B29C 47/6075* (2013.01); *B29C 47/6087* (2013.01); *B29C 47/767* (2013.01); *B29C 47/802* (2013.01); *B29C 47/92* (2013.01); *B29B 7/847* (2013.01); *B29C 47/0004* (2013.01); *B29C 47/40* (2013.01); *B29C 47/822* (2013.01); *B29C 2947/92704* (2013.01)

(58) Field of Classification Search
CPC .... B29C 47/38; B29C 47/402; B29C 47/805; B29B 7/186; B29B 7/482; B01F 7/241
USPC .......................... 366/76.4, 83, 84, 85, 14, 15
See application file for complete search history.

(56) References Cited

U.S. PATENT DOCUMENTS 2,615,199 A 10/1952 Fuller
2,968,836 A * 1/1961 Colombo ........................ 366/75
4,022,440 A * 5/1977 Kawamura et al. .......... 366/76.7

(Continued)

FOREIGN PATENT DOCUMENTS

JP 7088926 A 4/1995
JP 2010184372 A 8/2010

OTHER PUBLICATIONS

Office Action for related U.S. Appl. No. 14/211,674 dated Jul. 17, 2014, 6 pages.

(Continued)

*Primary Examiner* — Tony G Soohoo
*Assistant Examiner* — Anshu Bhatia
(74) *Attorney, Agent, or Firm* — Andrew M. Calderon; Roberts Mlotkowski Safran & Cole, P.C.

(57) ABSTRACT

An extruder is disclosed, and more particularly, a twin screw extruder for mixing, compounding, kneading and/or extruding of materials. The twin screw extruder includes a barrel assembly having a housing. The twin screw extruder further includes a first screw provided within the housing and comprising threads. The twin screw extruder further includes a second screw provided within the housing and comprising a threaded portion and a shaft portion devoid of threads. A drive system which drives the first screw and the second screw.

16 Claims, 3 Drawing Sheets

(51) Int. Cl.
  *B29C 47/40* (2006.01)
  *B29C 47/82* (2006.01)

(56) References Cited

U.S. PATENT DOCUMENTS

| | | | |
|---|---|---|---|
| 4,025,058 A | | 5/1977 | Mizuguchi |
| 4,077,754 A | * | 3/1978 | Borcher et al. ................ 366/83 |
| 4,269,085 A | | 5/1981 | Anders et al. |
| 4,877,390 A | * | 10/1989 | Ocker et al. ................ 366/318 |
| 5,651,944 A | * | 7/1997 | Schulz et al. ................ 366/88 |
| 6,068,466 A | | 5/2000 | Morita |
| 6,220,745 B1 | | 4/2001 | Kobayashi et al. |
| 6,298,751 B1 | | 10/2001 | Ide et al. |
| 6,299,340 B1 | * | 10/2001 | Lu et al. ................ 366/76.3 |
| 7,017,732 B2 | | 3/2006 | Uphus |
| 7,513,677 B2 | * | 4/2009 | Gneuss et al. ................ 366/83 |

OTHER PUBLICATIONS

Office Action for related U.S. Appl. No. 14/211,674 dated Apr. 23, 2015, 5 pages.
Final Office Action for related U.S. Appl. No. 14/211,674 dated Jan. 26, 2015, 7 pages.
Notice of Allowance dated Jun. 22, 2015 for related U.S. Appl. No. 14/211,674, 6 pages.

* cited by examiner

TWIN SCREW EXTRUDER

FIELD OF THE INVENTION

The invention relates to an extruder and, more particularly, to a twin screw extruder for mixing, compounding, kneading and/or extruding of materials.

BACKGROUND OF THE INVENTION

Several techniques are available to process materials, including twin screw extruders and batch mixers. Twin screw extrusion is used extensively for mixing, compounding, reacting and extruding materials. For example, twin screw extruders can be used for processing many types of polymeric materials; although other materials can also be processed with twin screw extruders such as raw materials for food processing.

In operation, twin screw extruders have a profile for extrusion of thermally sensitive materials (e.g., PVC) and specialty polymer processing operations, such as compounding, devolatilization, chemical reactions, etc. Also, twin screw extruders exhibit improved processing capabilities. For example, twin screw extruders can have intermeshing or non-intermeshing screws along each of their entire length and throughout the housing, and can be designed as co-rotating or counter-rotating to achieve particular mixing characteristics. In this way, using intermeshing screws, the twin screw extruders can offer improved feeding and more positive conveying characteristics, which allow the machine to process hard-to-feed materials (e.g., powders, slippery materials, etc.). The twin screw extruders also yield short residence times and a narrow residence time distribution (RTD). Also, the twin screw extruders exhibit improved mixing, with larger heat transfer areas to allow improved control of stock temperatures.

SUMMARY OF THE INVENTION

In a first aspect of the invention, a twin screw extruder comprises a barrel assembly comprising a housing. The twin screw extruder further comprises a first screw provided within the housing and comprising threads. The twin screw extruder further comprises a second screw provided within the housing and comprising a threaded portion and a shaft portion devoid of threads. The twin screw extruder further comprises a drive system which drives the first screw and the second screw.

In another aspect of the invention, an extruder comprises a barrel assembly comprising a first section, a second section and a third section. The extruder further comprises a threaded screw provided only within the first section and the second section. The twin screw extruder further comprises a screw having a threaded portion provided only within the second section and the third section.

In yet another aspect of the invention, a method of mixing material comprises: placing material within a hopper assembly for feeding into a first compartment; transporting the material from the first compartment to a second compartment using a single threaded screw configuration; kneading the material in the second compartment with a twin screw configuration; and metering the material to a die with a single threaded screw configuration, different than the single threaded screw configuration used for transporting.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention relates to an extruder and, more particularly, to a twin screw extruder for mixing, compounding, kneading and/or extruding of materials. In embodiments, the twin screw extruder of the present invention can be used as a compounder, mixer and a reactor. In embodiments, the twin screw extruder can be used for processing many types of materials. These materials can be, for example, polymeric and plastic materials, as well as raw materials for food processing. Of course, other material processes are also contemplated by the present invention. Also, advantageously, as described in more detail below, the twin screw extruder of the present invention significantly reduces material costs, and provides a simplified configuration, compared to conventional twin screw extruders.

More specifically, in the present invention, the twin screw extruder includes an alternating screw geometry (e.g., Z-shape), compared to a conventional parallel two screw configuration (e.g., U-shape). For example, in embodiments, the twin screw extruder of the present invention uses a screw to convey and transit molten materials, e.g., polymers, to the kneading section (transition zone); whereas, conventional twin screw extruders use two screws for providing this functionality. Accordingly, the conventional extruders have additional costs with regard to material costs, energy costs, etc., due to the need for twin screws along the entire system. Once the materials are conveyed to the kneading section, the twin screw extruder of the present invention uses two screws to knead, etc. the materials. At the end of the kneading process, a single screw then conveys the material to a die. In this way, the present configuration provides a single-twin-single screw configuration.

Accordingly and advantageously, the present invention provides a simplified design compared to existing complicated twin-screw extruders. That is, the present invention is able to significantly reduce material costs. Also, by using this simplified design, the present invention advantageously saves screw materials in the conveying and transition zones of the twin screw extruder, as well as simplifies the calculations required for calculating the flow rate of the material.

Figure 1:
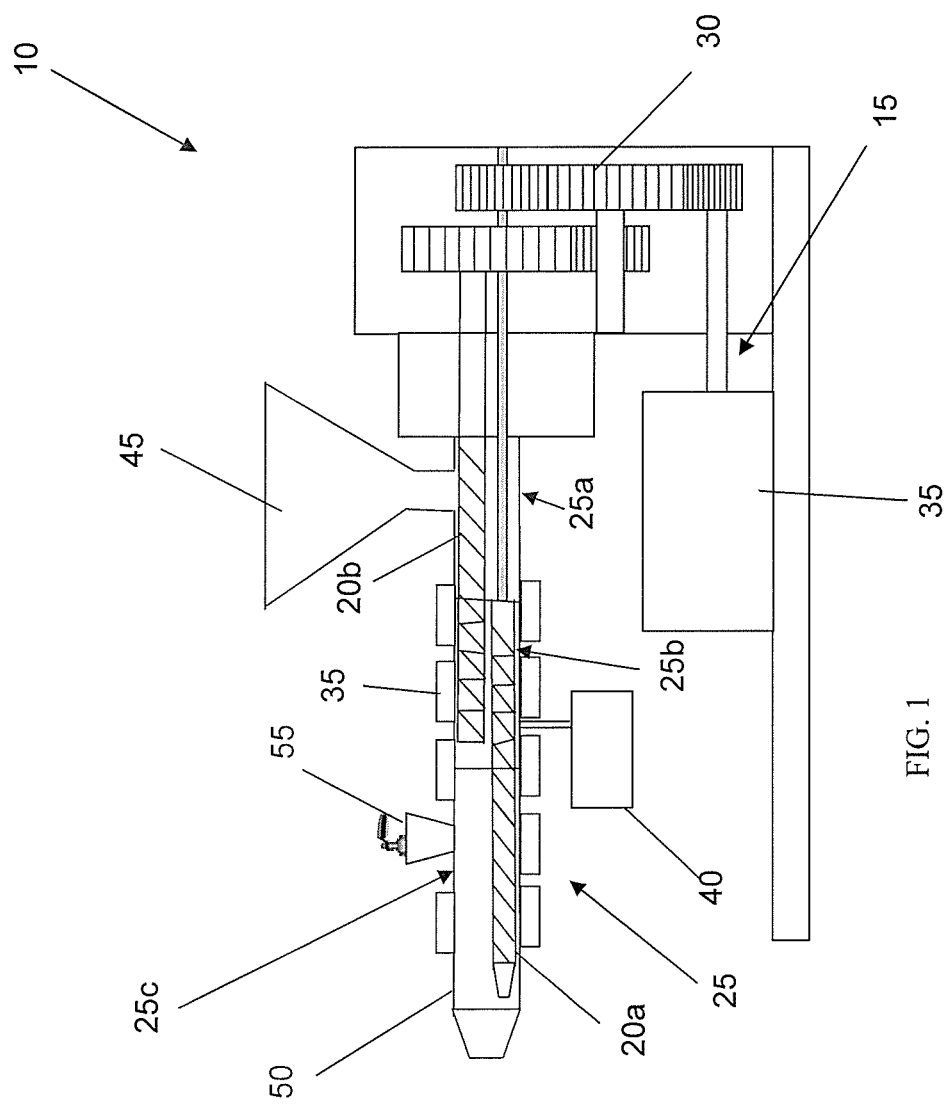
FIG. 1 shows a perspective view of the twin screw extruder in accordance with aspects of the present invention.

FIG. 1 shows a perspective view of the twin screw extruder in accordance with aspects of the present invention. More specifically, the twin screw extruder 10 includes a motor and drive system 15, for driving screws 20a, 20b housed within a barrel assembly 25. As described in more detail below, the barrel assembly 25 includes three compartments 25a, 25b and 25c. As shown, in this exemplary configuration, the motor and drive system 15 includes a plurality of gears 30 driven by motor 35 which, in turn, drives the twin screws 20a, 20b. As one of ordinary skill in the art should understand, the motor and drive system 15 can have many different configurations, and can provide variable drive rates for the twin screws 20a, 20b. For example, the motor and drive system 15 can provide both co-rotation and counter-rotation of the twin screws 20a, 20b.

In embodiments, the barrel assembly 25 includes three separate, adjacent compartments (e.g., sections) 25a, 25b and 25c. Specifically, compartment 25a is a conveying compartment, which is used to convey material fed from a hopper and feed system 45 to the adjacent compartment 25b. The compartment can also be used as a transition compartment. For example, heating of the material can begin in the compartment 25a through, for example, shearing friction and/or heaters. The barrel assembly 25 also includes a kneading compartment 25b, which is adjacent and in material flow communication with the conveying compartment 25a. As described herein, material can be mixed, kneaded, heated, melted, etc. within the kneading compartment 25b. A metering compartment 25c is adjacent to and in material flow communication with the kneading compartment 25b. The metering compartment 25c will transit material to a die 50. As should be understood by those of skill in the art, the die 50 can include any combination of arrangements, for extruding different shapes.

As optional components, the barrel assembly 25 can include heaters 35, as well as a cooling system 40. The heaters 35 are designed to heat material conveyed and kneaded within the barrel assembly 25. This will assist in the shearing of the material, as should be understood by those of skill in the art. An optional vent and vacuum port 55 can also be provided on the barrel assembly 25, preferably at the compartment 25c. The vent and vacuum port 55 can be used to vent gases from the melt.

As further shown in FIG. 1, the compartments 25a, 25b and 25c include the screw components, in different configurations. More specifically, the conveying compartment 25a includes a threaded portion of the screw 20b (e.g., screw elements); whereas, the screw 20a only has a shaft portion within the conveying compartment 25a. More specifically, the screw 20a in the conveying compartment 25a is devoid of screw elements. In this way, the conveying compartment 25a only includes a single screw configuration.

In the kneading compartment 25b, both screws 20a, 20b are threaded (e.g., twin screw configuration), which can be intermeshed or non-meshed, depending on the specific configuration of the present invention. In embodiments, the screw pattern of the screws 20a, 20b can also include different thread configurations within the kneading compartment 25b. For example, the screw pattern can be a kneading block screw element, as one illustrative, non-limiting example.

In the metering compartment 25c, only the threaded screw 20a is provided. In embodiments, to reduce material costs, the screw 20b will not extend into the metering compartment 25c, thus having its end terminating in the kneading compartment 25b. In this way, the twin screw configuration of the present invention has a single-twin-single screw configuration.

Figure 2:
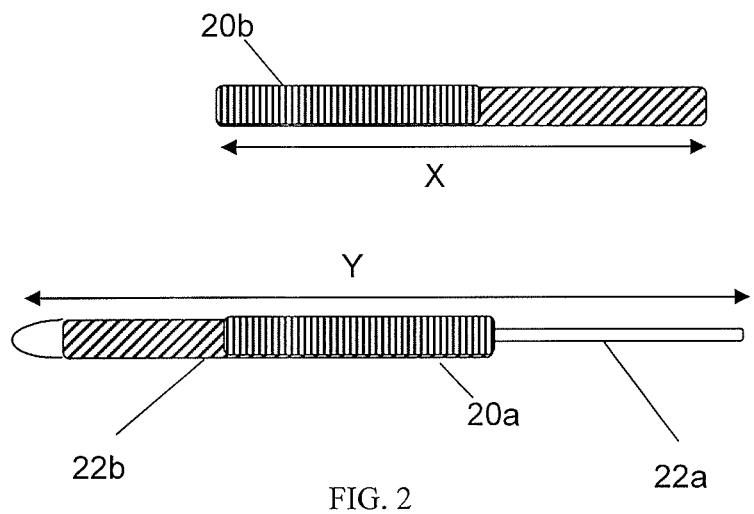
FIG. 2 shows an exploded view of the screws the twin screw extruder in accordance with aspects of the present invention.

FIG. 2 shows an exploded view of the screws 20a, 20b in accordance with aspects of the present invention. As shown in FIG. 2, screw 20b has a length "X", which is substantially fully threaded and is shorter than length "Y" of screw 20a. As should be understood by those of skill in the art, the length "X" of screw 20b corresponds to the length of the compartments 25a, 25b of FIG. 1; whereas, the length "Y" of screw 20a corresponds to the length of the compartments 25a, 25b, 25c of FIG. 1. In this way, the screw 20b will not extend within the compartment 25c.

Also, as shown in FIG. 2, the screw 20a has a shaft portion 22a (devoid of any thread elements) and a threaded portion 22b. In embodiments, the shaft portion 22a can be hollow, as it does no kneading, conveying, etc. of the material. In this way, additional material costs can be saved. As discussed above, the shaft portion 22a will reside in the compartment 25a of FIG. 1 with the threaded screw 22b, so that only a single threaded screw is present, e.g., threaded portion of screw 20b. On the other hand, the threaded portion 22b of screw 20a is configured to extend within the compartments 25b, 25c. In this way, threaded portions of the screws 20a, 20b will be provided in the compartment 25b; whereas, only the threaded portion of the screw 20a will be present in the compartment 25c.

Figure 3A:
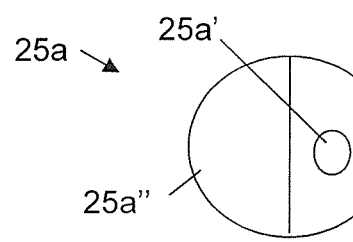
FIGS. 3a, 3b and 3c show the respective compartments (e.g., sections) of the twin screw extruder in accordance with aspects of the present invention.
Figure 3B:
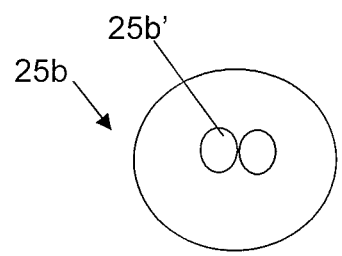
Figure 3C:
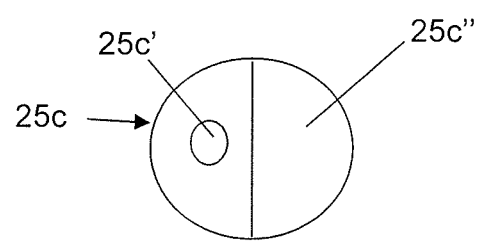

FIGS. 3a, 3b and 3c show the respective compartments 25a, 25b, 25c, in accordance with aspects of the present invention. As shown in these representations, the compartments are of a cylindrical shape. More specifically, FIG. 3a shows an exploded view of compartment 25a. As shown in this representation, the compartment 25a includes a hole 25a', for accommodating the threaded screw 20b. The compartment 25a includes a hollow section 25a", for accommodating the shaft portion of the screw 20a. As an example, the hollow section 25a" is only a cover. FIG. 3b shows an exploded view of compartment 25b. As shown in this representation, the compartment 25a includes a two hole configuration 25b' (e.g., similar to a figure 8 design), for accommodating the threaded screw 20b and the threaded portion 22b of the screw 20a. FIG. 3c shows an exploded view of compartment 25c. As shown in this representation, the compartment 25c includes a single hole 25c', for accommodating the threaded portion 22b of the screw 20a. In embodiments, the section 25c" may be removed, as there is no screw in this portion of the machine.

Figure 4A:
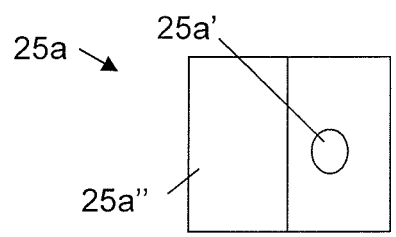
FIGS. 4a, 4b and 4c show alternative respective compartments (e.g., sections) of the twin screw extruder in accordance with aspects of the present invention.
Figure 4B:
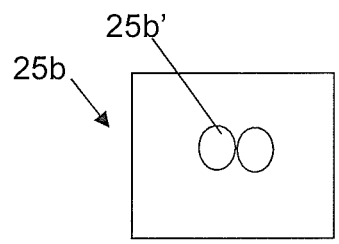
Figure 4C:
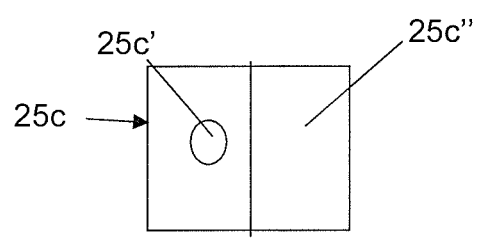

FIGS. 4a, 4b and 4c show alternative respective compartments 25a, 25b, 25c, in accordance with aspects of the present invention. As shown in these representations, the compartments are of a rectangular or square shape. More specifically, FIG. 4a shows an exploded view of compartment 25a. As shown in this representation, the compartment 25a includes a hole 25a', for accommodating the threaded screw 20b. The compartment 25a includes a hollow section 25a", for accommodating the shaft portion of the screw 20a. As an example, the hollow section 25a" is only a cover. FIG. 4b shows an exploded view of compartment 25b. As shown in this representation, the compartment 25a includes a two hole configuration 25b' (e.g., similar to a figure 8 design), for accommodating the threaded screw 20b and the threaded portion 22b of the screw 20a. FIG. 4c shows an exploded view of compartment 25c. As shown in this representation, the compartment 25c includes a single hole 25c', for accommodating the threaded portion 22b of the screw 20a. In embodiments, the section 25c" may be removed, as there is no screw in this portion of the machine.

In operation, material in the form of plastic pellets or powders, food, or other types of material are fed into the hopper and feed system 45, where they are conveyed and introduced into the compartment 25a, and make contact with the single threaded screw 20b. Depending on the operating conditions, materials will then transit to the melting zone, for polymers or plastics. It should be understood that the length/diameter (L/D) ratio of the threaded screw 20b may vary depending on the material specifications. As should be understood by those of skill in the art, the L/D ratio is the ratio of the flighted length of the screw to its outside diameter. The materials will then be shifted to the compartment 25b, transiting by way of the threaded screw 20b. In the compartment 25b, the material will be mixed, compounded, kneaded, etc. , via the twin screw configuration. The L/D ratio of the twin-screw section may also vary upon material specifications. The material will then pass to the compartment 25c, comprising the single screw 20*a*. Here, the material will be pushed outside of the extruder, through the die 50. The material can then be taken away by conventional take-off machinery (e.g., a pelletizer).

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A twin screw extruder, comprising:
    a barrel assembly comprising a housing and further comprises three compartments comprising a first compartment, a second compartment and a third compartment;
    a first screw provided within the housing and comprising threads which extend through the first and second compartments;
    a second screw provided within the housing and comprising a threaded portion which partially overlaps with the threads of the first screw in the second compartment, the threaded portion which partially overlaps with the threads of the first screw are of a different threaded configuration than the threads of the first screw, and the second screw further comprises a shaft portion in the first compartment extending from the threaded portion to a drive system and being devoid of threads which partially overlaps with the threads of the first screw;
    the drive system which drives the first screw and the second screw; and
    an inlet which feeds material from a hopper into the first compartment, wherein the first compartment houses the threads of the first screw and the shaft of the second screw so that transporting of the material from the first compartment to the second compartment will be carried out using the threaded portion of the first screw.

2. The twin screw extruder of claim 1, wherein the shaft portion of the second screw is hollow.

3. The twin screw extruder of claim 1, wherein the first screw extends only in the first compartment and the second compartment.

4. The twin screw extruder of claim 3, wherein the threaded portion of the second screw is provided only in the second compartment and the third compartment.

5. The twin screw extruder of claim 4, wherein the first screw has a length shorter than a length of the second screw, and both the first screw and the second screw are driven by the drive system at one end of the housing.

6. The twin screw extruder of claim 1, further comprising:
    a venting system extending from the barrel assembly;
    heaters on the barrel assembly; and
    a die extending from an end of the barrel assembly.

7. The twin screw extruder of claim 1, wherein:
    the first screw is provided with threads along its length and which extends partly through the housing, including a conveying section and a kneading section; and
    the second screw extends substantially entirely through the housing, and includes the threaded portion in the kneading section and a metering section extending to a die.

8. The twin screw extruder of claim 7, wherein the shaft portion is hollow.

9. The twin screw extruder of claim 8, wherein the shaft portion of the second screw is provided in the conveying section.

10. An extruder, comprising:
    a barrel assembly comprising a first section, a second section and a third section;
    a threaded screw being provided only within the first section and the second section;
    a screw with a threaded portion, wherein the screw includes a shaft portion devoid of threads in the first section, adjacent the threaded screw in the first section, and wherein the threaded portion of the screw is provided only within the second section and the third section, wherein the threaded portion of the screw and a threaded portion of the threaded screw have different screw configurations within the second section and the first section only includes a single screw configuration consisting of the threaded portion of the threaded screw; and
    an inlet which feeds material into the first section which consists only of the threaded portion of the threaded screw and the shaft portion of the screw so that transporting of the material from the first section to the second section is carried out only by the threaded portion of the threaded screw.

11. The extruder of claim 10, wherein the threaded screw is shorter than the screw.

12. The extruder of claim 10, wherein the shaft portion of the screw is hollow.

13. The extruder of claim 10, wherein the first section is a conveying section, the second section is a kneading section and the third section is a metering section, bringing material to a die.

14. The extruder of claim 10, wherein the threaded screw and the threaded portion of the screw are both provided only in the second section.

15. The extruder of claim 10, wherein:
    the threaded screw is provided with threads along substantially its length and extends in the first section and the second section, up to the third section;
    the screw extends substantially entirely through the first section, the second section and the third section; and
    further comprising a drive system which drives both the threaded screw and the screw from a first end of the barrel assembly.

16. The twin screw extruder of claim 7, wherein:
    the shaft portion of the second screw is hollow;
    the second compartment includes a two hole configuration and the first and third compartments include a single hole configuration;
    the first screw extends only in the first compartment and the second compartment;
    the threaded portion of the second screw is provided only in the second compartment and the third compartment;
    the shaft portion of the second screw which is devoid of any threads is positioned in the first compartment; and
    the first screw has a length shorter than a length of the second screw, and both the first screw and the second screw are driven by the drive system at one end of the housing.

* * * * *